United States Patent [19]
Mio et al.

[11] Patent Number: 4,619,852

[45] Date of Patent: Oct. 28, 1986

[54] PILE OF LEAD METAL SHEETS FOR SHIELDING ENVIRONMENT FROM HARMFUL SOURCE

[75] Inventors: Kotaro Mio, Ikeda; Yasuo Ijiri, Itami, both of Japan

[73] Assignee: Dainichi-Nippon Cables, Ltd., Hyogo, Japan

[21] Appl. No.: 612,767

[22] Filed: May 22, 1984

[30] Foreign Application Priority Data

May 23, 1983 [JP] Japan .................................. 58-90362

[51] Int. Cl.[4] .......................... B32B 1/06; B32B 3/06; B32B 15/08

[52] U.S. Cl. ......................................... 428/68; 428/35; 428/99; 428/198; 428/216; 428/461

[58] Field of Search ...................... 428/461, 328, 311.5, 428/216, 68, 99, 198, 35

[56] References Cited

FOREIGN PATENT DOCUMENTS 3098 2/1964 Japan .................................. 428/461
30680 8/1977 Japan ................................ 428/311.5
24599 7/1978 Japan .................................. 428/328

*Primary Examiner*—Thomas J. Herbert
*Attorney, Agent, or Firm*—Armstrong, Nikaido, Marmelstein & Kubovcik

[57] ABSTRACT

A light weight, flexible environmental shield for shielding an object on one side of said shield from emissions from a source at the other side of said shield, said shield comprising a plurality of lead metal sheets stacked one upon another, each said lead metal sheet comprising a lead metal foil which is reinforced on one or both sides with an organic material having a resistance against the harmful source. The shield is useful for shielding an environment from a radioactive source and a harmful gas, and for soundinsulating.

13 Claims, 10 Drawing Figures

PILE OF LEAD METAL SHEETS FOR SHIELDING ENVIRONMENT FROM HARMFUL SOURCE

BACKGROUND OF THE INVENTION

The present invention relates to a pile of lead metal sheets for shielding an environment from a harmful source such as radioactive rays, noise, or harmful gases.

Lead is widely used as a shielding material, owing to its high density and relatively low cost and is usually used in the form of plate. However, to obtain the desired shielding the plate requires a considerable thickness, and therefore is inflexible and often disadvantageous.

In order to provide flexibility, mats comosed of lead fibers have been used. However, due to frequent attachment and removal of the mat the fibers are soon damaged. Furthermore, the ratio of lead per unit volume is low, which does not allow for maximum shielding. A thicker mat does not allow easy handling and storage.

An object of the present invention is to provide a pile of lead metal sheets which has excellent flexibility, bending property, mechanical strength for an extended period of time and sufficient shielding effect.

SUMMARY OF THE INVENTION

The present invention releates to a pile of at least two lead metal sheets for shielding an environment from a harmful source, each of the metal sheets comprising a lead metal foil which is reinforced on at least one side with an organic polymer having a resistance against the harmful source.

The pile of the present invention can be prepared by employing the lead metal sheet as a constructing unit and piling at least two lead metal sheets so as to obtain the desired shielding effect.

DETAILED EXPLANATION OF THE INVENTION

Figure 1:
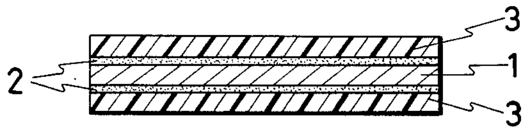
FIG. 1 shows a schematic sectional view of an embodiment of the lead metal sheet used in the present invention.

The lead metal sheet has an excellent endurance against repeated bending or folding, excellent mechanical strength, chemical resistance and flexibility. Since the pile of the present invention is assembled by merely piling the lead metal sheets, the pile inherits the excellent properties from the lead metal sheet, and each individual lead metal sheet of the pile can be independently deformed or displaced when force is applied to the pile. Therefore, the pile of the present invention is easy to handle due to its free bending or folding, and is durable in repeated folding-extending treatment.

As the lead metal used in the present invention, lead or an alloy of lead with other elements can be employed. Pure lead at least 99.5% by weight in purity has good softness, and therefore has excellent flexibility and bending property in the form of foil. Examples of the pure lead are six kinds of pig lead defined in JIS H 2105 (1955). Preferable purity of the pig lead is not less than 99.8% by weight, particularly not less than 99.9% by weight. A lead alloy having a similar flexibility in the foil to the pure lead may be employed. For shielding radioactive rays it is preferable to employ a lead alloy having a specific gravity of not less than 10. Examples of the lead alloy are alloys of lead with tin and/or antimony, and the like.

The thickness of the lead metal foil is 20 to 500 $\mu$m, more preferably 50 to 150 $\mu$m. A lead metal foil having less than 20 $\mu$m in thickness is difficult to make, and must be reinforced with a thick layer of organic polymer for obtaining the desired mechanical strength, making the pile bulky. A lead metal foil having more than 500 $\mu$m in thickness is inferior in flexibility, so that even if the reinforcing layer is provided the effects of the present invention cannot be obtained.

The reinforcing layer made of an organic material reinforces the lead metal foil and can also protect it from corrosion, and therefore can provide a lead metal sheet with excellent machanical strength, endurance against bending a folding, and corrosion resistance.

The application of the reinforcing layer of organic polymer is not limited and various options can be employed depending on the type of shielding required. More than one layer can be applied to either or both sides of the lead metal foil. Also the layers can consist of the same kind or different kinds of organic polymer.

The thickness of the reinforcing layer varies depending on the use of the pile. The preferable thickness of the reinforcing layer on one side of the foil is 10 to 300 $\mu$m, preferably 20 to 200 $\mu$m, most preferably 20 to 100 $\mu$m. A lead metal sheet reinforced with a layer having less than 10 $\mu$m in thickness is usually inferior in mechanical strength. A lead metal sheet reinforced with a layer having more than 300 $\mu$m in thickness is bulky. The tensile strength of the reinforcing layer is, for instance, not less than 0.3 kg/mm$^2$, preferably not less than 0.5 kg/mm$^2$, more preferably not less than 0.8 kg/mm$^2$.

The organic polymer, having a good film-forming property is preferable. Examples of the polymer used against a radioactive source are, polyolefins which do not contain any halogen atoms and have few tertiary carbon atoms, such as polyethylene, ethylene-ethyl acrylate copolymer, ethylene-propylene copolymer, ethylene-vinyl acetate copolymer and ethylene-butene 1 copolymer; polyesters such as polyethylene terephthalate and polybutylene terephthalate; polystyrenes. Since the polyethylene has high shielding effect against nuetrons, the lead metal sheets reinforced with the polyethylene is advantageous in case of shielding an environment from a nuetron radiating source.

In the present invention the reinforcing layer can be applied to the lead metal foil by a variety of processes, using an organic polymer or a precursor thereof, for instance, by adhering a film or a sheet of organic polymer, or by applying a solution, an emulsion or by a melt of organic polymer or a precursor thereof, followed by a necessary curing.

High adhesive strength between the lead metal foil and the reinforcing layer is not required. However the preferable peel adhesive strength is not less than 0.3 kg/inch (ASTM D 1876).

The pile of the present invention comprises at least two lead metal sheets. The number of lead metal sheets is optionally selected depending on the conditions to be shielded such as kinds of harmful source and manners of handling. For shielding radioactive sources, a sufficient sheilding effect can be obtained in general by piling the lead metal sheets so as to be not less than about 2 mm in total lead thickness, e.g. piling 20 to 40 sheets of the lead metal sheets.

The pile of the present invention is more specifically explained by means of the following embodiments with the accompanied drawings. It is to be understood that the present invention is not limited to the embodiments. Various changes and modifications may be made in the invention without departing from its spirit and scope thereof.

Figure 2:
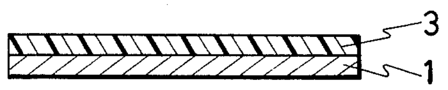
FIG. 2 shows a schematic sectional view of another embodiment of the lead metal sheet used in the present invention.
Figure 3:
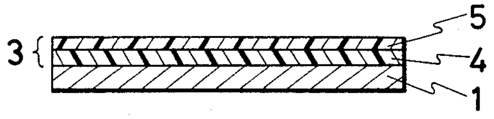
FIG. 3 shows a schematic sectional view of the other embodiment of the lead metal sheet used in the present invention.
Figure 10:
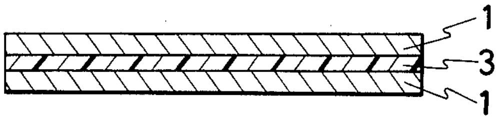
FIG. 10 shows a schematic sectional view of an embodiment of the lead metal sheet used in the present invention.

In FIG. 1 the numeral 1 represents a lead metal foil. On the both sides of the lead metal foil 1, reinforcing layers 3 are sticked by an adhesive layers 2. The embodiment in FIG. 2 is a lead metal sheet on one side of which a reinforcing layer 3 is provided by direct coating, laminating or hot-pressing. The embodiment in FIG. 3 is a lead metal sheet having on one side thereof a reinforcing layer 3 consisting of a layer 4 and a layer 5. Furthermore, the metal sheet may be prepared by placing a reinforcing layer 3 between two lead metal foils 1 as shown in FIG. 10.

The pile of the present invention is assembled by piling the lead metal sheets. When the lead metal sheet having a reinforcing layer on one side of the lead metal foil is used, it is preferable that the sheets are arranged so that the reinforcing layer of one sheet is in contact with the surface of the lead metal foil of the next sheet. However, the sheets may also be arranged so that the reinforcing layer of one sheet is in contact with the reinforcing layer of the next sheet.

Figure 4:
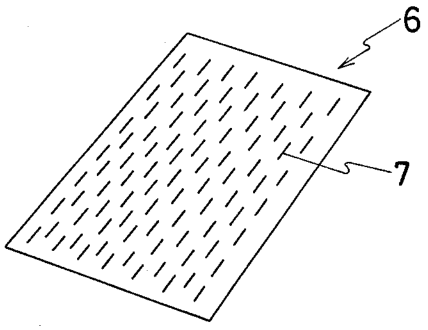
FIG. 4 shows a schematic perspective view of an embodiment of the lead metal sheet used in the present invention.

Referring to FIG. 4, in order to improve the flexibility of the pile, slits 7 can be provided in the lead metal sheet 6. These slits may be cut through the organic polymer as well, or only into the lead metal foil with the organic polymer applied later. Lead metal sheets with slits cannot be used for shielding against harmful gases, but these is no problem for sound insulation or radioactive ray shields. The slits are positioned in the lead metal sheets in order that when piled they do not align assuring maximum protection.

Sufficient shielding can be obtained by enclosing a harmful source with the pile which is assembled by only piling the sheets, and securing the pile to the source with a proper fastener. For easy handling the pile is preferably set and used in a form of unit. For example, the piled lead metal sheets may be fixed at one or more points, preferably at both ends, or may be enveloped in a bag. When using a bag, the sheets may be either fixed with each other or not, or may be fixed to the bag.

Figure 5:
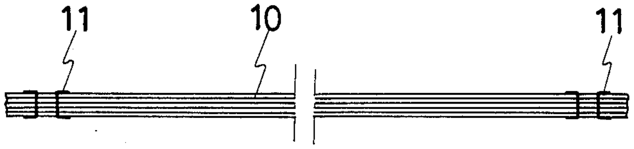
FIG. 5 shows a schematic sectional view of the pile of the present invention.
Figure 6:
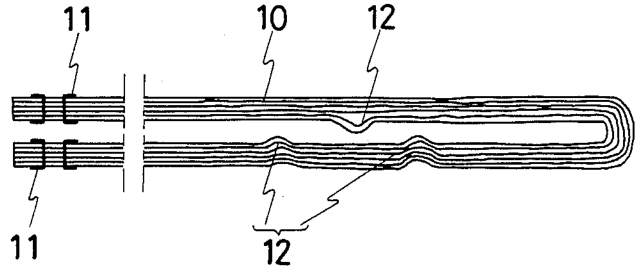
FIG. 6 shows a schematic sectional view of the embodiment of FIG. 5 when it is folded.

In the embodiment shown in FIG. 5, the lead metal sheets 10 are fixed together at both ends by means of fasteners 11. When the pile is folded, the inner lead metal sheets partially form wrinkles 12 as shown in FIG. 6, which makes the folding of the pile easy. The wrinkles 12 do not exert serious problems on durability of the pile, because the lead metal sheets have excellent flexibility and folding endurance.

The lead metal foil used in the embodiment shown in FIG. 5 is preferably made of pure lead which contains not less than 99.5% lead by weight, particularly not less than 99.8% lead by weight. The thickness of the pure lead metal foil is prefarably 50 to 150 μm, and the total thickness of the reinforcing layer provided on one or both sides of the foil is preferably 20 to 100 μm.

Figure 7:
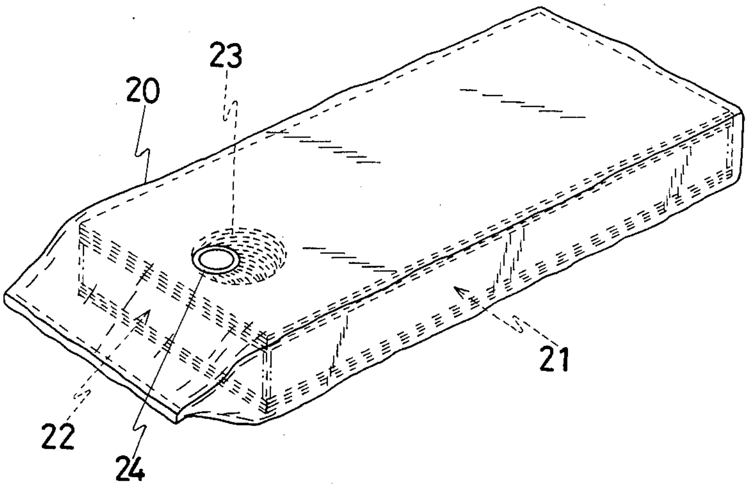
FIG. 7 shows a schematic perspective view of another embodiment of the pile.
Figure 8:
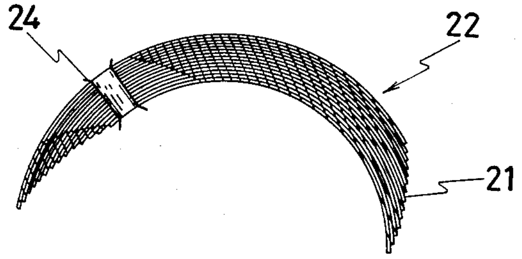
FIG. 8 shows a schematic sectional view of the embodiment of FIG. 7 when it is bent.

Another embodiment of the present invention is shown in FIGS. 7, 8. The numeral 20 represents a bag in which a pile 22 assembled by piling the lead metal sheets 21 is enveloped. Every sheet 21 has a bore 23 and is attached to the bag 20 through the bore 23 by means of a fastener 24. The pile 22 may be tightly secured to the bag 20 or may be loosely attached to the bag 20. In the latter case, a loose-fitting may be obtained by making the diameter of the bore 23 of the sheet 21 larger than that of the fastener 24. When the diameter of the bore 23 is larger than that of the fastener 24, the deviations yielded between the adjacent sheets are absorbed by the space between the bore 23 and the fastener 24 as shown in FIG. 8. Therefore, no strain is produced in the pile.

Figure 9:
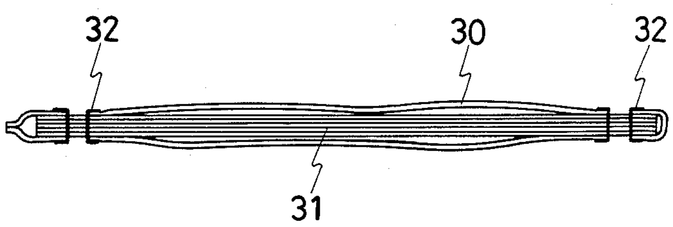
FIG. 9 shows a schematic sectional view of an embodiment of the pile.

Referring to FIG. 9, lead metal foil is of pure lead and the piled lead metal sheets 31 enveloped in a bag 30 may be tightly fixed to the bag 30 at both ends with fasteners 32. The fixed lead metal sheets behave in the same manner as in the embodiment shown in FIG. 6, when the pile is bent or folded.

The pile of the present invention can be used not only in a manner of winding the pile around the curved surface of the harmful source, but also in a manner of hanging or laying on the floor.

Materials which have a resistance against harmful sources can be used for bag material. Examples of such bag material are, woven fabric, non woven fabric, film or sheet made of natural fiber or synthetic resin such as polyester or nylon; woven or non woven fabric made of inorganic fiber such as metal fiber, glass fiber or asbestos fiber; the above materials which are surface-treated with polyethylene, polyvinyl acetate, ethylene-vinyl acetate copolymer or elastomer.

The size of the lead metal sheet is not limited, but may be varied according to use.

The present invention is more specifically described and explained by means of the following Examples. It is to be understood that the present invention is not limited to these Examples and various changes and modifications may be made to the invention without departing from its spirit and scope.

EXAMPLES 1 TO 3

The lead foil (purity: 99.90% by weight, the third pig lead defined in JIS H 2105 (1955)) and the lead alloy foil (lead content: 93±1.5% by weight, tin content: 5±1% by weight, antimony content: 2±0.5% by weight) having thicknesses shown in Table 1 was employed. To one or both sides of the foil, an urethane resin adhesive of Takelac A-310/Takenate A-3 available from Takeda Chemical Industries, Ltd. was applied in thickness of 3 to 5 μm with a brush. On the adhesive layer a polyvinylchloride film or a polyethylene terephalate film having a thickness shown in Table 1 was set, and then was pressed under a pressure of 10 kg/cm$^2$ at 80° C. for 10 minutes, and aged at 40° C. for 24 hours to produce the lead metal sheet.

EXAMPLES 4 TO 10

To one or both sides of the lead foil or the lead alloy foil having a thickness shown in Table 1, a polyethylene film or a polypropylene film having a thickness shown in Table 1 was laminated via a hot-melt adhesive film of about 20 μm in thickness by means of hot-pressing to obtain the lead metal sheet. For the polyethylene film, Admer-VE 300 available from Mitsui Petrochemical Industries, Ltd. was employed as a hot-melt adhesive film, and the hot-pressing was carried out at a pressure of 10 kg/cm$^2$ and at a temperature of 180° C. For the polypropylene film, Admer-QE 305 available from Mitsui Petrochemical Industries, Ltd. was employed as a hot-melt adhesive film, and the hot-pressing was carried out at pressure of 10 kg/cm$^2$ and at a temperature of 200° C.

EXAMPLES 11 TO 12

To one side of the lead foil or the lead alloy foil having a thickness shown in Table 1, a hot-melt adhesive film of about 70 μm in thickness was laminated as a reinforcing layer, and then hot-pressed to produce the lead metal sheet. Hot-melt adhesive film, the modified low density polyethylene film, i.e. Sarlin 1652 available from Mitsui Polychemical Co., Ltd. was employed, and the hot-pressing was carried out at a pressure of 10 kg/cm$^2$ and at a temperature of 180° C.

In Table 1, PVC, LDPE, PET ad PP represent a polyvinylchloride film, a low density polyethylene film, a polyethylene terephthalate film and a polypropylene film, respectively.

COMPARATIVE EXAMPLES 1 TO 3

A lead plate of 2 mm in thickness, a lead alloy plate of 2 mm in thickness and lead fibers were prepared.

For the folding endurance test, the lead plate and the lead alloy plate having 100 μm in thickness were also employed, and the lead fiber mats were arranged so that the total thickness of the fibers were about 100 μm.

The lead metal sheets produced were measured for folding endurance, flexibility and breaking length. Description of tests are as follows.

Folding endurance test

The test was conducted according to JIS P 8115-1976, except that the clamp curvature was 6 mm radius; the vertical tension was 100 g; the tension at 90% was 600 g.

Flexibility

The lead metal sheets (width: 200 mm, length: 500 mm) were piled so that the total thicknes of lead was 2 mm. The piled sheets were enveloped in a bag which had a size somewhat larger than that of the sheet. The bag was wound around a mandrel having a diameter of 20 mm to observe the easiness of the winding.

O: Easy to wind

X: Difficult to wind

Breaking length

The test was conducted according to JIS P 8113. The results are shown in Table 1.

TABLE 1

| Example No. | Lead metal sheet: Lead metal foil | Lead metal sheet: Reinforcing layer | Folding endurance (times) | Flexibility | Breaking length (m) |
|---|---|---|---|---|---|
| 1 | Lead foil of 100 μm thick | Rigid PVC of 50 μm thick (both sides) | >2000 | O | 520 |
| 2 | Lead foil of 200 μm thick | PET of 38 μm thick (one side) | >2000 | O | 490 |
| 3 | Lead alloy foil of 50 μm thick | LDPE of 30 μm thick on one side and PET of 38 μm on another side | >2000 | O | 1700 |
| 4 | Lead foil of 100 μm thick | PP of 50 μm thick (both sides) | >2000 | O | 780 |
| 5 | Lead foil of 100 μm thick | LDPE of 200 μm thick (one side) | >2000 | O | 330 |
| 6 | Lead alloy foil of 50 μm thick | LDPE of 100 μm thick (one side) | >2000 | O | 500 |
| 7 | Lead alloy foil of 100 μm thick | LDPE of 50 μm thick (one side) | >2000 | O | 345 |
| 8 | Lead alloy foil of 100 μm thick | LDPE of 30 μm thick (both sides) | >2000 | O | 320 |
| 9 | Lead foil of 100 μm thick | LDPE of 100 μm thick (both sides) | >2000 | O | 310 |
| 10 | Lead foil of 150 μm thick | LDPE of 50 μm thick (both sides) | >2000 | O | 360 |
| 11 | Lead foil of 100 μm thick | Modified LDPE of 70 μm thick (one side) | >2000 | O | 180 |
| 12 | Lead alloy foil of 100 μm thick | Modified LDPE of 70 μm thick (one side) | >2000 | O | 290 |
| Comparative Example 1 | Lead plate of 2 mm thick | — | 145 | X | 100 |
| Comparative Example 2 | Lead alloy plate of 2 mm thick | — | 132 | X | 200 |
| Comparative Example 3 | Lead fibers | — | 104 | O | 92 |

What we claim is:

1. A light weight, flexible environmental shield for shielding an object on one side of said shield from emission from a source at the other side of said shield, said shield comprising a plurality of flexible sheets stacked one upon another, each said stacked sheet consisting essentially of a lead metal foil sheet reinforced on at least one of its sides with an organic polymer resistant to the emissions to be shielded and affixed to the surface of said lead metal foil.

2. An environmental shield as recited in claim 1, wherein the lead metal sheets are enveloped in a bag.

3. An environmental shield as recited in claim 2, wherein the lead metal sheets are attached with the bag at one or more points.

4. An environmental shield as recited in claim 3, wherein the lead metal foil is a lead foil containing not less than 99.5% lead by weight and having 50 to 150 μm in thickness, and the reinforcing organic polymer layer has 20 to 100 μm in thickness, and all of the lead metal sheets are fixed with the bag at both ends of the bag.

5. An environmental shield, as recited in claim 1, wherein the organic polymer has a resistance against a radioactive source.

6. An environmental shield, as recited in claim 1, wherein the organic material is a polyethylene.

7. An environmental shield as recited in claim 1, wherein the lead metal sheet comprises the lead metal foil which is reinforced on one side with the organic polymer.

8. An environmental shield as recited in claim 1, wherein the lead metal sheet comprises the lead metal foil which is reinforced on both sides with the organic polymer.

9. An environmental shield as recited in claim 1, wherein the lead metal sheet comprises two sheets of the lead metal foils between which the organic polymer is placed.

10. An environmental shield as recited in claim 1, wherein the lead metal sheets are fixed together at one or more points.

11. An environmental shield as recited in claim 1, wherein the lead metal is a lead alloy.

12. An environmental shield as recited in claim 1, wherein the lead metal is lead.

13. An environmental shield as recited in claim 12, wherein the lead is a pure lead containing not less than 99.5% lead by weight.

* * * * *